United States Patent [19]

Steinke

[11] 3,993,796
[45] Nov. 23, 1976

[54] HIGH FAT FEED PELLETS AND METHOD OF MANUFACTURE

[75] Inventor: Frederick H. Steinke, Crestwood, Mo.

[73] Assignee: Ralston Purina Company, St. Louis, Mo.

[22] Filed: May 15, 1974

[21] Appl. No.: 469,990

[52] U.S. Cl. .............................. 426/630; 426/454
[51] Int. Cl.² ........................................... A23L 1/36
[58] Field of Search ........... 426/601, 608, 611, 630, 426/634, 635, 656, 657, 623, 454

[56] References Cited
UNITED STATES PATENTS

| | | | |
|---|---|---|---|
| 388,339 | 8/1888 | Brinck | 426/630 |
| 2,472,663 | 6/1949 | Kleine | 426/630 |
| 2,899,307 | 8/1959 | Wilson | 426/635 X |
| 2,928,738 | 3/1960 | Kruse | 426/630 |
| 2,947,632 | 8/1960 | Kruse | 426/630 |
| 2,968,559 | 1/1961 | Thurman | 426/630 |
| 2,970,911 | 2/1961 | Lerz | 426/630 X |
| 2,978,326 | 4/1961 | Kruse | 426/634 |
| 3,014,800 | 12/1961 | Guidocelli | 426/630 |
| 3,015,563 | 1/1962 | Rosenberg | 426/601 X |
| 3,268,336 | 8/1966 | Hale | 426/623 |
| 3,594,176 | 7/1971 | Morris | 426/656 X |
| 3,598,610 | 8/1971 | Hawley | 426/634 |
| 3,843,808 | 10/1974 | Zicarrelli | 426/656 X |

*Primary Examiner*—Robert Halper
*Attorney, Agent, or Firm*—Veo Peoples, Jr.

[57] ABSTRACT

A method of production of animal feed pellets made from oleaginous seeds and containing high levels of fat or other nutrient material. More particularly, hard, dry high fat feed pellets containing up to 50% fat are produced with the fat incorporated prior to the pelleting operation and is thereby distributed throughout the pellet.

9 Claims, No Drawings

HIGH FAT FEED PELLETS AND METHOD OF MANUFACTURE

BACKGROUND OF THE INVENTION

Pelletized feeds have long been known and are recognized as serving useful purposes in the field of animal nutrition. Such pelletized feeds have been produced by a variety of methods and from a variety of ingredients. An important additive to feeds to be pelletized has been fat.

Many years ago, fat was added to the feed mixture prior to the pelletizing operation and the mixture was then heated and forced through the die of a pellet mill. However, this method was very crude and had several drawbacks such as, the amount of added fat was limited to less than 4 percent and the pellet was of extremely poor structural quality. Specifically, the resultant pellets were soft and disintegrated readily into meal with the amount of fines ranging up to 45–50 percent. Such soft pellets were not of marketable quality.

Later, attempts were made to produce these pellets from a feed mixture having as much as 10 percent fat, but an undesirable soft product with a greasy surface resulted. Under normal warehouse storage conditions these pellets were completely deformed to a pulpy mass.

More recently, other processes such as described in U.S. Pat. No. 3,014,800 and U.S. Pat. No. 2,945,764 have attempted to solve the above-described problems related to manufacturing high fat pellets by a more expensive and time consuming technique of first mixing and comminuting a composite of ingredients, then the ingredients are pelleted, afterwards the pellets are dried and finally hot liquid fat is sparyed onto the hot pellets. Although this method provides hard pellets, the maximum amount of total fat which can be incorporated within and onto the pellet without causing undesirable crumbling and a high percentage of fines is from 10–20 percent.

It is also noted that the prior art methods utilized oleaginous seed meal as a feed ingredient which was defatted or had its natural oil removed. Accordingly, it was thought imperative that in order to adequately obtain a fat content approaching 20 percent, the fat or oil would have to be added to the pellets in a separate step subsequent to pelletizing, otherwise the degradation of particle hardness would result. Additionally, it was thought that obtaining a fat content which exceeded 20 percent would be impossible without softness, friability, crumbling and greasy texture.

However, it is now desirable that animals such as horses, poultry, swine, cattle and monkeys consume higher levels of fat per unit of diet than found in the prior art. In accordance therewith, it is highly desirable that pelleted feeds contain greater than 20 percent fat and upwards towards 50 percent fat in order that the feed provide the animals with an adequate supply of fat to fulfill its requisite energy needs while at the same time consuming lower levels of other feed ingredients. An additional advantage of high fat pellets is that of slicker more aesthetic coats rather than fulfilling the animals' appetites with other feed ingredients which are deficient in this regard. The present invention will provide a more efficient feed which can supply in a small portion of the diet, the fat needed by these animals.

SUMMARY OF THE INVENTION

It is an object of this invention to provide hard dry feed pellets containing from 15 to 50 percent fat, and preferably from 20–30 percent fat.

It is also an object of this invention to provide such high fat pellets by a process which incorporates the requisite supply of fat prior to the pelleting operation.

Generally these objects are fulfilled by comminuting oleaginous seeds, and, when even higher fat levels are desired, mixing in a spray dried blend of a protein isolate and edible oil, and steam conditioning the mixture and thereafter pelletizing it. It has been found that this process provides hard dry pellets at fat levels approaching and exceeding 20 percent.

DESCRIPTION OF THE PREFERRED EMBODIMENTS

The raw materials of the present invention are oleaginous seeds and a spray dried blend. The spray dried blend will consist primarily of edible oil and protein isolate.

By "oleaginous" seeds, it is meant that the seeds of the present invention, either with hulls or dehulled, will not be defatted prior to processing but rather will contain their natural oils intact. The oleaginous seeds of the present invention are edible seeds having from about 15 to about 45 percent oil such as soybeans, cottonseeds, sunflower seeds, rape seeds, and the like. It is preferred that soybeans be utilized in the present invention, especially whole soybeans (hull intact), because of their plentiful supply, high nutritional content, and ease of processing.

The edible oils added to the spray dried blend are oils such as soybean oil, cottonseed oil, safflower oil, animal fat and the like. The added oil will constitute from about 40 to about 65 percent by weight of the spray dried blend but preferably 50 percent because of ease of production and optimal results.

The protein isolate utilized in the spray dried blend is any vegetable derived or animal derived water dispersible protein which has been separated from the carbohydrates, sugars, and other non-protein material. For purposes of the present invention a water solution of the protein isolate is prepared by forming a slurry of the protein isolate and water whcih comprises a weight ratio of solids to water of about 8:1 or greater. One preferred embodiment of this invention encompasses the use of a protein isolate sold and manufactured under the registered trademark of Supro 610 by Ralston Purina Company and described in U.S. Pat. No. 3,642,490.

The spray dried blend mentioned above is prepared by withdrawing water, via conventional spray drying techniques, from an oil-in-water emulsion in which the edible oil is the dispersed phase and a water solution of the protein isolate is the continuous phase. Various emulsifying agents may be utilized in the slurry such as monoamino phosphatides, e.g., lecithin; esters of polyhydric alcohols, e.g. 12 to 24 carbon atom fatty acids; polyoxyethylene sorbitan monolaurate; polyoxyethylene sorbitan trioleate, and other emulsifiers suitable for oil in water and protein emulsions. By this process, the dispersed oil phase is completely entrapped in a solid proteinaceous phase. The resultant dry solid particles are utilized as the fat supplement herein referred to as the spray dried blend. It can be mixed with feed ingredients prior to pelletizing the feed, in an amount such that as high as 50 percent by weight of the resulting mixture is fat, and yet will not cause undue slippage in the pelletizing dies nor detract from the hardness of the pellets.

In the process of the present invention, hard dry animal feed pellets are made by a series of steps.

First, the oleaginous seeds are comminuted to a finely divided particle size, e.g., less than 0.110 inch in diameter, and preferably less than 0.065 inch. If desired, the seeds could be heated, prior to being ground, at for example about 100° C. for about 25 minutes in order to denaturize that protein, or destroy enzymes and other natural materials that inhibit digestibility of the protein. It is desirable for purposes of this invention that the natural oils not be removed from the comminuted seeds at this point nor at any other point in this process.

Secondly, the comminuted seeds having their oil still intact are mixed with from 0 to about 45% of their weight of the previously described spray dried blend. The precise amount of spray dried blend utilized will depend on the amount of fat in the seeds as compared with the amount of fat in the blend and the amount of fat desired in the resultant product. Generally it is preferred to use 25% of the blend, based on the total weight of the seeds, because when soybeans are used as a preferred embodiment, the 25% will accommodate enough fat from a 50% blend to provide excellent pellet quality.

It is noted that other feed ingredients could also be added, if desired, such as anti-oxidants, solvent extracted soybean meal, wheat, corn, rice, whey, milo, other grains, wheat extracts, vitamin or mineral supplements, etc.

Next, the mixture of comminuted seeds and spray dried blend is steam heated to a temperature of from about 170° F. to about 200° F. Temperatures higher than 200° F. will drive off unduly excessive amounts of moisture. Temperatures lower than 170° F. will drive off too little moisture. It is especially preferred that the mixture contain about 17% moisture by weight of the mixture, after steam heating, in order to bind the ingredients together most effectively. Heating to 180° F. will provide about a 17% level of moisture content.

Finally, the mixture is pelletized. The pelleting can occur via any one of the conventional pelleting apparatus. The pellets are then dried, by any conventional drying means, to a moisture content of from about 0 to about 14% H$_2$O.

The final pellets will contain from 15–50% fat preferably 20–30% fat and are found to be hard and dry as evidenced by their durability scores of from 70–85% using the Kansas State University Pellet Durability Test.

These pellets can be used as carriers for fat in a blend of 3 pellets, i.e., vitamin pellet, mineral pellet and the high fat pellet itself. Alternatively, blends of these fat pellets can be incorporated with poultry, swine, livestock and specialty feeds to boost the fat content of a substantially grain feed.

In an especially preferred embodiment of this invention, the pellets were made from whole soybeans and a soybean oil and Supro 610 spray dried blend such that the final pellets contained 27% fat. These pellets proved to be excellent fat pellets for horse feeds because they substantially improved the gloss of horses' coats.

The following examples are given in order to illustrate more fully the manner in which this invention is carried out, but are not intended to thereby limit the abovedescribed invention:

EXAMPLE I

One hundred fifty pounds of whole, unextracted soybeans were cooked in an autoclave in 10 lb. batches at 100° C. using sparge steam. Then the soybeans were dried and ground through a 1511 – 0065 screen on a Fitz Mill (Fitz Patrick Co., Chicago, Illinois). A spray-dried product which contained 51% soybean oil and 40% Supro 610 protein isolate, plus various amounts of emulsifiers and water, was produced by emulsifying the oil in an aqueous solution of the Supro and then spray drying. The spray dried blend and the comminuted soybeans were used in various amounts and under various conditions in the runs outlined in Table I.

TABLE I

| Run | Amount Soybeans | Amount Spray Dried Product | Temp. | Moisture Content Prior to Pelleting | Durability by Kansas State Univ. Test | Fat Content Dried Pellets |
|---|---|---|---|---|---|---|
| 1 | 30 | 3.33 (+7 g. santiquin anti-oxidant) | 180° F | 16.8% | 77.4% | 23.7 |
| 2 | 30 | 3.33 | 190° F | 12.6% | 72.2% | 24.1 |
| 3 | 30 | 7.5 | 180° F | 11.2% | 83.0% | 26.8 |

EXAMPLE II

Several attempts were made to prepare pellets containing over 20% fat by other techniques, none of which worked. For example:

1. Forty pounds crude casein was mixed with 10 lbs. soybean oil and an attempt was made to pellet the mixture. Result: no pellets formed.
2. Twenty-six pounds of finely ground defatted soybean meal (49% protein) was mixed with 6.5 lbs. of soybean oil, then steam conditioned to 190° F. and pressed. Result: no pellets.
3. Ground whole soybeans mixed with spray dried product composed of 60% soybean oil and 40% protein isolate with and without water was pressed without applying heat. Result: no pellets.
4. Spray dried mixture of 50% oil and 50% protein isolate without other feed ingredients was pressed. Result:
   a. with heat — poor pellets
   b. without heat — no pellets.

What is claimed is:

1. A process for manufacturing hard, dry high fat animal feed pellets, containing from above 20 to about 50% fat, characterized by the presence of high levels of fat prior to pelleting and comprising the steps of comminuting oleaginous seeds to a finely divided state, mixing the comminuted seeds with from 25 to about 45% of its weight of a spray dried blend of vegetable oil and protein isolate, said spray dried blend containing from about 40 to about 65% oil, heating the resultant mixture of comminuted seeds and spray dried blend to a temperature of from about 170° F. to about 200° F. with steam and then pelleting said mixture.

2. The process of claim 1 wherein the oleaginous seed is selected from the group consisting of rape seeds, whole soybeans, whole cottonseeds, whole sunflower seeds, dehulled soybeans, dehulled cottonseeds and dehulled sunflower seeds.

3. The process of claim 1 wherein the oleaginous seed is full fat soybean.

4. The process of claim 1 wherein the vegetable oil is selected from the group consisting of soybean oil, cottonseed oil, and safflower oil.

5. The process of claim 1 wherein the oleaginous seeds are heated at about 100° C. for about 25 minutes prior to comminuting said seeds.

6. The process of claim 1 wherein the mixture is heated to 180° F. with steam.

7. The process of claim 1 wherein the spray dried blend contains 50% oil.

8. The process of claim 1 wherein the weight of spray dried blend constitutes 25% by weight of the seeds.

9. The process of claim 1 wherein the oil is soybean oil.

* * * * *